Patented May 12, 1942

2,282,456

UNITED STATES PATENT OFFICE 2,282,456

PRODUCTION OF HIGH MOLECULAR WEIGHT RESINOUS SUBSTANCES

Friedrich Christmann and Heinz Lemme, Lugwigshafen-on-the-Rhine, and Hans Bueren, Mannheim, Germany, assignors, by mesne assignments, to William E. Currie, New York, N. Y.

No Drawing. Application August 23, 1938, Serial No. 226,252. In Germany August 27, 1937.

3 Claims. (Cl. 260—29)

The present invention relates to improvements in the manufacture and production of resinous condensation products.

We have found that resinous compounds which are valuable in particular as improving agents for lubricating oils can be obtained by causing unsaturated carbon compounds to act upon resinous substances in the presence of solvents which have a good solubility for boron fluoride and consist substantially of hydrocarbon derivatives containing halogen and if desired oxygen, with the assistance of boron fluoride or a bleaching earth treated with fluorine compounds, the reaction being carried out, if desired, under pressure.

The products obtained impart to lubricating oils with a steep temperature-viscosity curve a very high viscosity index and good film-forming properties, even when added only in a small percentage. They are also suitable for use in the varnish and lacquer industries and have excellent dielectric properties.

Suitable natural and synthetic resinous substances are especially those containing aromatic or other cyclic radicals and preferably having a molecular weight of about 30,000 to 120,000 or more, such as polystyrol, condensation products from halides of olefines, such as ethylene chloride, and aromatic carbon compounds, such as benzene, naphthalene, anthracene, polymerization products of indene, coumarone, or phenol or urea formaldehyde resins or condensation products from chlorinated or unsaturated carbon compounds, and, if desired, aromatic carbon compounds, which may contain sulphur or nitrogen, or pressure extracts from coals.

Among unsaturated carbon compounds which are caused to react with the resinous substances may be mentioned cracking or dehydrogenation products of hard and soft paraffin wax or oil fractions containing the same, or of fractions of mineral oil, destructive hydrogenation or extraction products or reduction products of carbon monoxide with and without pressure, furthermore unsaturated gaseous hydrocarbons or unsaturated alcohols, ketones, esters or other unsaturated carbon compounds which contain oxygen, sulphur or nitrogen.

The unsaturated carbon compounds which are caused to react with the resinous substances may also consist of a mixture of singly- and poly-unsaturated carbon compounds. In this case there are obtained resinous or rubber-like substances which may be used in varnish, lacquer and rubber industries or as agents for improving lubricating oils. As poly-unsaturated compounds there may be mentioned for example butadiene, isoprene or poly-unsaturated compounds having polar groups, as for example chloroprene.

The two reaction components are dissolved in a solvent which is preferably of aliphatic nature, such as ethylene chloride, dichlorethyl ether, chloroform, tetrachlorethane, or the corresponding compounds of other halogens, and then treated for a prolonged time with boron fluoride or its addition compounds, for example with alcohols, phenols or acids, at temperatures of between about 70° below zero C. and about 100° C., preferably at from 40° to 60° C. The resulting product is recovered by distilling off the solvent. Bleaching earth such ts Terrana, fuller's earth and the like, having been pretreated with hydrogen fluoride or boron fluoride, may also be used as condensing agents.

The following examples will further illustrate the nature of this invention but the invention is not restricted to these examples. The parts are by weight.

Example 1

100 parts of cracking products of paraffin wax which boil between 50° and 260° C. and which have been obtained by the cracking of solid paraffin wax at 500° C. are added to a solution of 100 parts of polystyrol in 300 parts of ethylene chloride.

Boron fluoride is led into this mixture at a temperature of from 40° to 60° C. When the reaction is complete the solvent is distilled off. The residue is heated at 200° C. in vacuo, any traces of boron fluoride thus being eliminated. The tough, highly viscous product remaining in a yield of 95 per cent with (reference to the amount of polystyrene and cracking product) is most suitable for use in improving the viscosity index of lubricating oils. When added to an engine oil having a viscosity index of +5 and a viscosity of 6.3° Engler at 50° C. in an amount of 1.2 per cent, the viscosity index is raised to +95 while the viscosity is raised to 10.4° Engler at 50° C.

Using as diluent agent instead of ethylene dichloride carbon disulfide a highly viscous polymerization product suitable for the improvement of lubricating oil is not formed.

Example 2

35 parts of polystyrol (having an average molecular weight of about 80,000) and 65 parts of olefines prepared by cracking from an oil obtained from carbon monoxide by hydrogenation boiling at from about 180° to 325° C. are dissolved in 150 parts of ethylene chloride and treated with boron fluoride at room temperature. The viscous mass thus formed is dissolved in 180 parts of an engine oil (viscosity 8.5° Engler at 50° C.), freed from ethylene chloride by distillation and treated with steam at between 130° and 150° C. About 270 parts of a tough mass are thus obtained which contains about 33 per cent of polyalkyl styrol. When adding 3 per cent of the said mass to an engine oil having a viscosity of 1.65° Engler at 99° C. and a viscosity index of 15, the viscosity of the oil is raised to 2.07° Engler at 99° C. and the viscosity index is raised to 90.

*Example 3*

45 parts of polystyrol (having an average molecular weight of about 120,000) and 55 parts of butylene are dissolved in 300 parts of ethylene chloride and treated with boron fluoride for some hours at room temperature. Ammonia is led into the viscous mass thus formed, whereupon the ethylene chloride is distilled off, the boron fluoride contained in the mass escaping with ammonia as a molecular compound. By drying the reaction product in vacuo at about 100° C. a product is obtained which can be rolled out and which is very elastic in the heat.

*Example 4*

40 parts of polymerized styrene having a molecular weight of about 120,000, 40 parts of a product obtained by repeated cracking of paraffin wax at 500° C. and 20 parts of butadiene are dissolved in ethylene chloride and condensed during 7 hours while leading in boron fluoride at temperatures of from 10° below zero to 40° C. Ammonia is then led into the reaction product and the solvent distilled off, whereby the boron fluoride still contained in the mass escapes as ammonium compound. The product is then dried for some hours at 100° C. in vacuo. A product which is capable of being rolled and which is very elastic when hot is obtained.

What we claim is:

1. A process for the production of high molecular resinous substances which comprises causing gaseous to liquid unsaturated hydrocarbons in which the unsaturation is due to double bonds to act upon a substance selected from the group consisting of resinous organic condensation and polymerization products, derived at least partly from compounds containing an aromatic nucleus, in the presence of a halogen containing solvent for said components which is capable of dissolving boron fluoride and selected from the class consisting of dichlorethyl ether and halogen containing normally liquid, saturated, aliphatic hydrocarbons containing not more than 2 carbon atoms, by the agency of a substance selected from the class consisting of boron fluoride and bleaching earth treated with hydrogen fluoride.

2. The process as defined in claim 1 wherein said unsaturated hydrocarbons are a mixture of singly- and poly-unsaturated hydrocarbons.

3. The process as defined in claim 1, wherein said unsaturated hydrocarbons are obtained by cracking oils rich in hydrogen.

FRIEDRICH CHRISTMANN.
HEINZ LEMME.
HANS BUEREN.